(12) United States Patent
Ciotti

(10) Patent No.: US 6,272,914 B1
(45) Date of Patent: Aug. 14, 2001

(54) DEVICE FOR INDICATING CALIPER PAD WEAR IN DISC BRAKES

(75) Inventor: Alessandro Ciotti, Ponte S. Pietro (IT)

(73) Assignee: Freni Brembo, S.p.A., Bergamo (IT)

( * ) Notice: Subject to any disclaimer, the term of this patent is extended or adjusted under 35 U.S.C. 154(b) by 0 days.

(21) Appl. No.: 09/361,745

(22) Filed: Jul. 27, 1999

(51) Int. Cl.$^7$ .................................................. F16D 66/02
(52) U.S. Cl. ................... 73/121; 73/129; 340/454
(58) Field of Search .................. 73/121–131; 340/453, 340/454

(56) References Cited

U.S. PATENT DOCUMENTS

| | | | |
|---|---|---|---|
| 4,280,594 | * 7/1981 | Baum | 188/1 A |
| 4,742,326 | * 5/1988 | Gregoire et al. | 340/52 A |
| 5,087,907 | 2/1992 | Weiler et al. | 340/454 |
| 5,538,103 | * 7/1996 | Rueckert et al. | 188/1.11 |
| 5,697,472 | * 12/1997 | Walker et al. | 188/1.11 W |
| 5,848,673 | * 12/1998 | Strauss et al. | 188/1.11 L |

FOREIGN PATENT DOCUMENTS

| | | |
|---|---|---|
| 2 716 509 | 8/1995 | (FR) . |
| 2 029 528 | 3/1980 | (GB) . |

* cited by examiner

*Primary Examiner*—George Dombroske
(74) *Attorney, Agent, or Firm*—Townsend and Townsend and Crew LLP

(57) ABSTRACT

Device for indicating wear of the pads of friction material in so-called floating calipers used in the disc brakes of vehicle wheels and generally comprising a caliper body (13) which is mounted so that it can slide axially by means of at least one hole (12) on at least one guide pin (10, 11), one end of which is rigidly connected, directly or indirectly, to the wheel stub axle, the axis of the guide pin and of the corresponding hole in the caliper body being perpendicular to the plane of the brake disc (18), a pair of pads (19, 20) positioned so that they straddle the disc (18), and a hydraulic piston (26) which acts directly on one (19) of the said pads and indirectly on the other pad (20), via the said caliper body (13).

The device includes a linear electrical displacement transducer (34, 35) positioned between a point (32) integral with the said guide pin (10, 11) and a point (38) integral with the said caliper body (13) which slides with respect to the guide pin (10, 11).

A signal is obtained which gives the current state of wear of the pad and from which the remaining mileage safely permitted by the pad can also be calculated.

5 Claims, 5 Drawing Sheets

DEVICE FOR INDICATING CALIPER PAD WEAR IN DISC BRAKES

BACKGROUND OF THE INVENTION

The present invention relates to a device for indicating wear of the pads of friction material in so-called floating calipers used in the disc brakes of vehicle wheels and generally comprising a caliper body which is mounted so that it can slide axially by means of at least one hole on at least one guide pin, one end of which is rigidly connected, directly or indirectly, to the wheel stub axle, the axis of the guide pin and of the corresponding hole in the caliper body being perpendicular to the plane of the brake disc, a pair of pads positioned so that they straddle the disc, and a hydraulic piston which acts directly on one of the said pads and indirectly on the other pad, via the said caliper body.

As is known, the pads of friction material in the brakes are subject to wear and have to be replaced when their thickness falls below a minimum value in order to ensure safe braking.

Since these pads are carried by support shoulders which form an integral part of the brake bracket, and given that the latter is mounted in a position which is by no means easy for the driver to inspect himself, checks on the operational state of the pads are only carried out by specialist personnel on an occasional basis, with the risk that the check may be made only once the thickness has already worn beyond the minimum value permitted within the bounds of safety.

In order to overcome this disadvantage, devices for indicating the state of wear of the brake pads are already known within the state of the art, but such devices give the driver a solely visual signal once the state of wear of at least one pad exceeds a certain pre-established limit.

In addition, known warning devices have the disadvantage that they take up a lot of room around the brake caliper, where the space available is limited, and that they do not allow the pads to be replaced without first having to be removed.

The object of the present invention is therefore to provide a warning device that allows the change in thickness of at least one of the pads of a brake caliper to be monitored continuously, thereby giving the driver of the vehicle on which the brake is fitted a signal that lets him know the actual state of wear of the pad and that also enables the remaining mileage permitted by the pad to be calculated and thus displayed instantaneously.

A further object of the present invention is to devise a warning device which is compact and which allows the pads to be replaced without first having to remove it.

SUMMARY OF THE INVENTION

These objects are achieved by a device for indicating wear of the pads of friction material in so-called floating calipers used in the disc brakes of vehicle wheels and comprising a caliper body which is mounted so that it can slide axially by means of at least one hole on at least one guide pin, one end of which is rigidly connected, directly or indirectly, to the wheel stub axle, the axis of the guide pin and of the corresponding hole in the caliper body being perpendicular to the plane of the brake disc, a pair of pads positioned so that they straddle the disc, and a hydraulic piston which acts directly on one of the said pads and indirectly on the other pad, via the said caliper body, a linear electrical displacement transducer positioned between a point connected with the said guide pin and a point connected with the said caliper body which slides with respect to the guide pin.

BRIEF DESCRIPTION OF THE DRAWING

The invention will now be described in greater detail with reference to a preferred embodiment thereof, this description being given solely by way of non-limiting example and being illustrated in the appended drawings in which.

DETAILED DESCRIPTION

Figure 1:
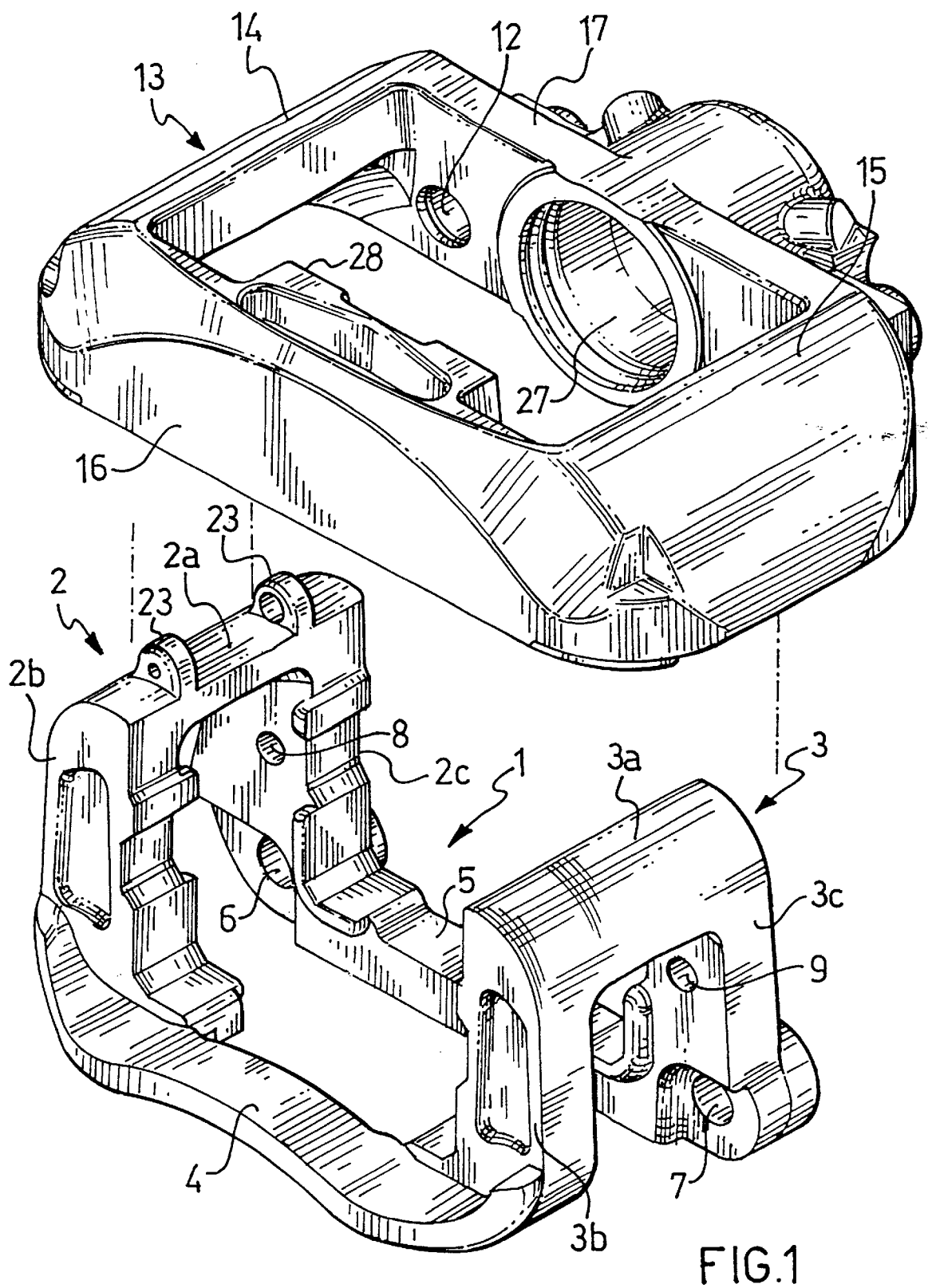
FIG. 1 shows an exploded perspective view of the bracket and caliper body assembly of a floating disc brake to which the present invention refers.

With reference to the above figures, the numeral 1 denotes the brake bracket as a whole which, in its known version, consists of two yokes 2 and 3, each shaped like an upturned U and lying in its own plane set a certain distance apart from each other. Each yoke has a crosspiece 2a and 3a and legs 2b, 2c and 3b, 3c, respectively.

The yokes 2 and 3 are connected together by rod-like members 4 and 5 which are made in one piece with the pairs of legs 2b, 3b and 2c, 3c.

The legs 2c and 3c each have a hole 6 and 7 respectively which, via screw means (not illustrated), enable the bracket to be fixed to the wheel stub axle in the conventional manner.

Another pair of tapped holes 8 and 9, formed in the legs 2c and 3c, are designed to house the threaded ends 10a of corresponding screws 10, the shanks of which pass longitudinally through an associated tubular element 11. The head 10b of the screw 10 engages in the end 11a of the element 11, forming a unit referred to as a guide pin which is rigidly fixed to the bracket 1. Each guide pin is housed in a corresponding hole 12 formed in the caliper body, which is denoted as a whole by the reference 13 and is formed by a rectangular frame having opposite sides 14, 15 and 16, 17.

The caliper body 13 is fitted on the bracket 1 and is connected thereto by means of the pair of guide pins 10, 11 which are slidably housed in the holes 12.

Figure 2:
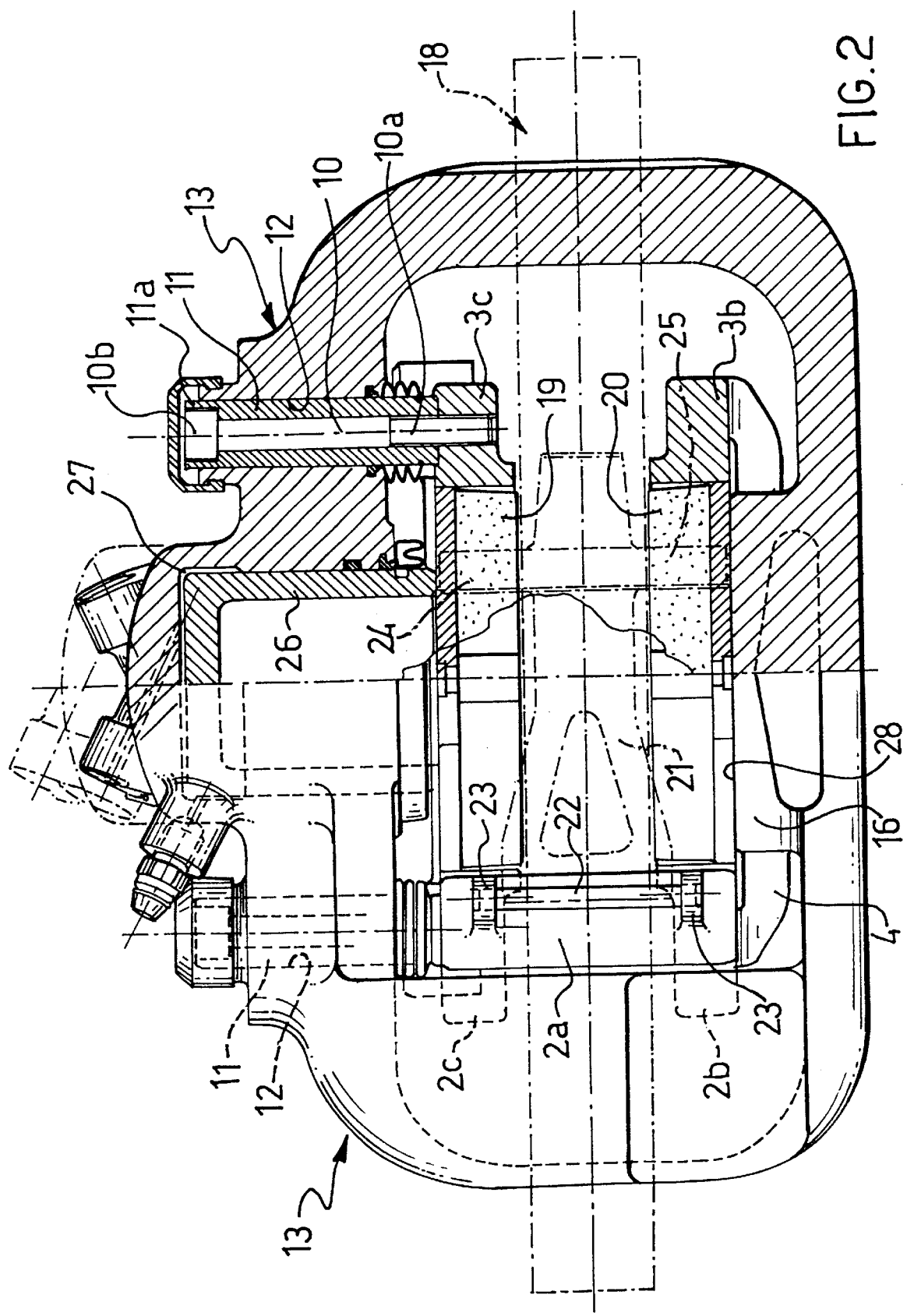
FIG. 2 shows a view from above in partial cross-section of a known type of floating disc brake, without the device of the present invention.

As may be seen in FIG. 2 especially, the bracket 1 straddles the disc 18 which is perpendicular to the longitudinal axes of the guide pins 10, 11 and of their corresponding holes 12.

The same bracket 1 supports the pair of opposing pads 19 and 20 in the conventional manner.

One end of a leaf spring 21 is anchored to the pin 22 engaged in the lugs 23, while its other end is inserted underneath the crosspiece 3a of the yoke 3.

At an intermediate point along its axial length the spring 21 has two bent wings 24 and 25 which act elastically on the pads 19 and 20 respectively.

The pad 19 is therefore elastically pushed against the end of the hydraulic piston 26, operating inside the cylinder 27 formed in the caliper body 13, in its side 17.

The opposing pad 20, on the other hand, is pressed against the wall 28 of the side 16 of the said caliper body 13.

Within the framework of a structure such as the one described hitherto, according to the present invention, one of the tubular elements 11 and its screw 10, as shown in FIG. 2, is replaced by a cylindrical body 29 fitted with a threaded spigot 30 which engages in the tapped hole 9 in the leg 3c of the bracket 1.

This cylindrical body 29, which is housed in one of the through holes 12 in the caliper body 13, together with its threaded spigot 30, performs the same function with respect to the caliper body 13 as a guide pin 10, 11.

It also has an axial cavity 31 which is closed at the bottom 32 and open at the opposite end 33 which projects out of the hole 12.

According to the present invention, the said axial cavity 31 houses a linear electrical transducer, known per se, which comprises a first rod-like element 34 and a second rod-like element 35, the movable point 35a of which is constantly pressed against the bottom 32 by a spring denoted schematically by the reference 36.

The end 37 of the first rod-like element 34 of the transducer, on the other hand, is rigidly but removably fixed to the caliper body 13, for example by means of an elastic cap 38.

This cap can be replaced by other equivalent means, for example screw means.

The electrical signal derived from the transducer is picked up by the cable 39 and transmitted to a computer (not shown).

A flexible bellows 40 surrounds that part of the cylindrical body 29 that projects out of the hole 12 in order to protect against dust and dirt.

As is known, by actuating the brake lever, pressure is generated in the hydraulic system which terminates at the cylinder 27 which, via the piston 26, presses the pad 19 against the side of the disc 18. As a result of the reaction force, transmitted via the caliper body 13, the pad 20—on which the wall 28 of the side 16 of the caliper body 13 acts—is simultaneously pressed against the disc, thereby producing the braking action.

When the brake lever is released, the pads 19 and 20 return to their rest positions close to the disc 18.

As the friction material of the pads 19 and 20 is gradually worn down, the latter automatically adjust, coming closer and closer to the disc 18 and consequently causing a corresponding displacement of the caliper body 13 with respect to the guide pin 10, 11.

In order to measure the state of wear of the pads 19 and 20, the solution proposed by the present invention involves generating an electrical signal which is directly proportional to the magnitude of displacement of the caliper body 13 with respect to the cylinder 29, which is integral with the bracket 1, as the thickness of the pad 20 gradually wears down and as the latter therefore gets closer and closer to the disc 18.

This displacement is measured by the point 35a of the second rod-like element 35 of the transducer which is held in constant contact with the bottom 32 of the cylindrical element 29 which is connected with the bracket 1.

The electrical signal generated is picked up via the cable 39. It allows the state of wear of the pad 20 to be evaluated and its remaining working life to be calculated, ultimately giving the mileage the vehicle can still travel on the remaining pad thickness.

The invention can be subject to numerous variations, including having the transducer in the form of a wiper type potentiometer.

Figure 3:
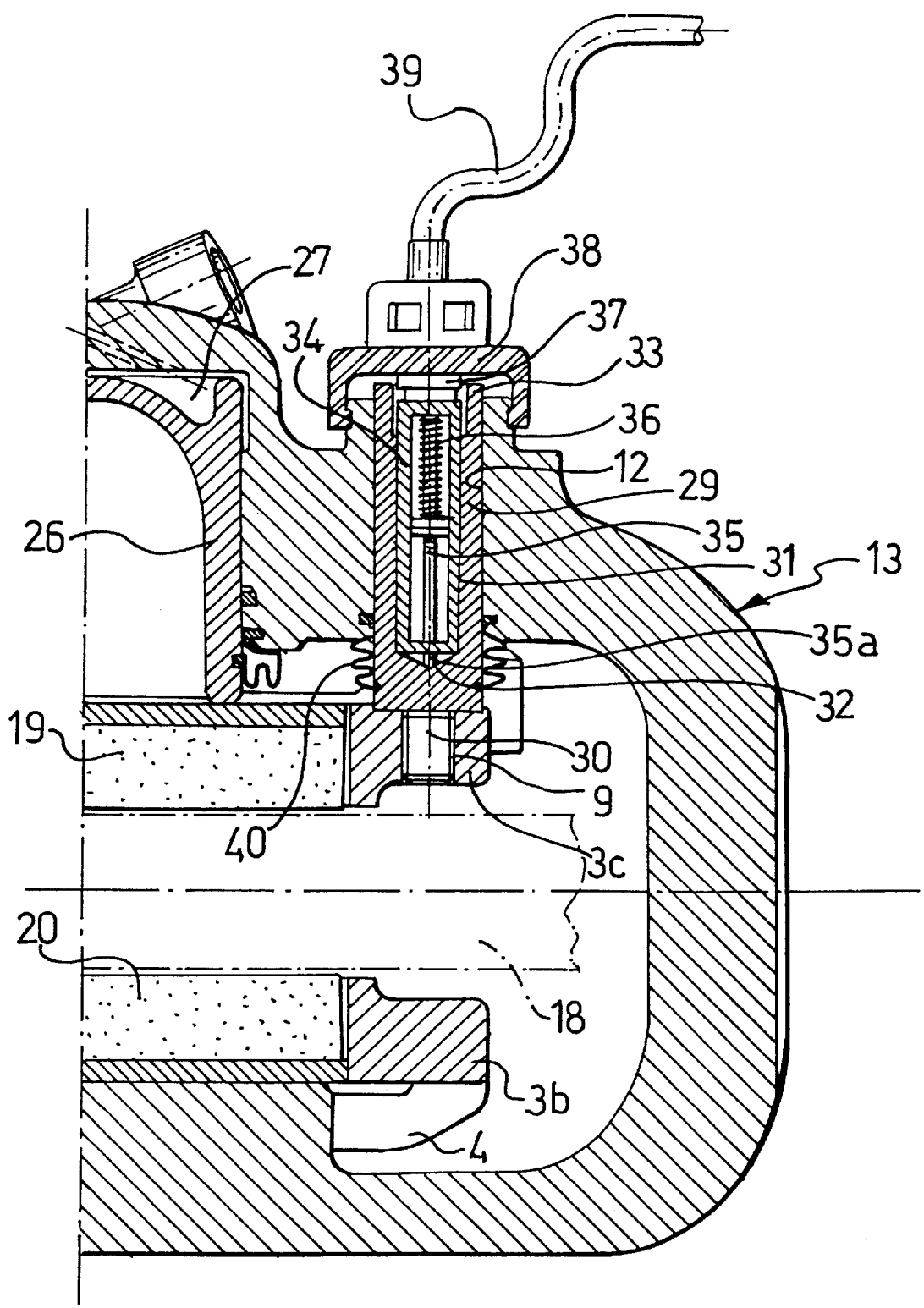
FIG. 3 shows a schematic cross-section through one half of a brake, such as the one in FIG. 2, modified to include the pad wear warning device according to the invention, this device being shown in the position assumed when the pads are not yet worn.
Figure 4:
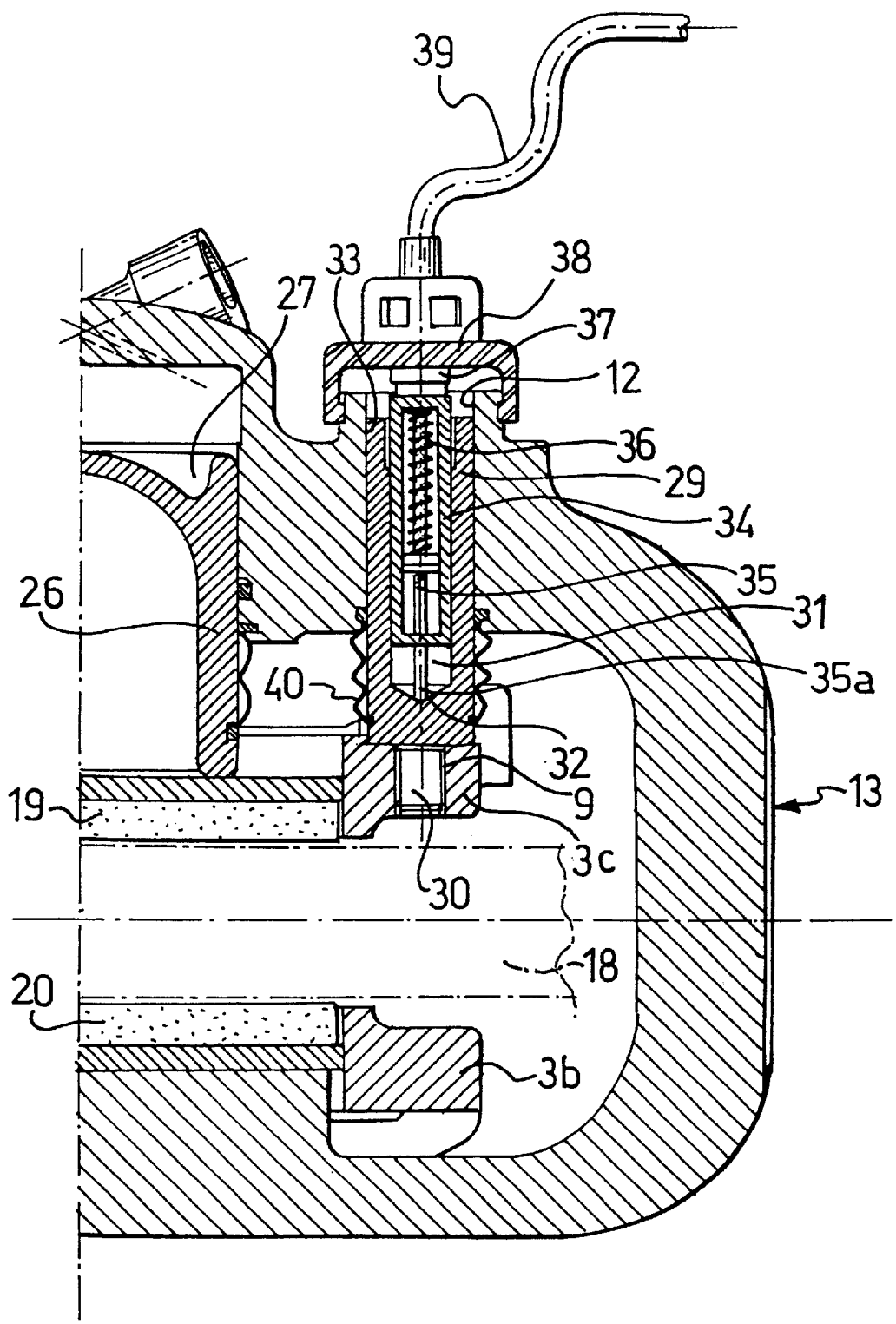
FIG. 4 shows the same cross-section as in FIG. 3 but with the warning device in the position assumed when the pads are partly worn.
Figure 5:
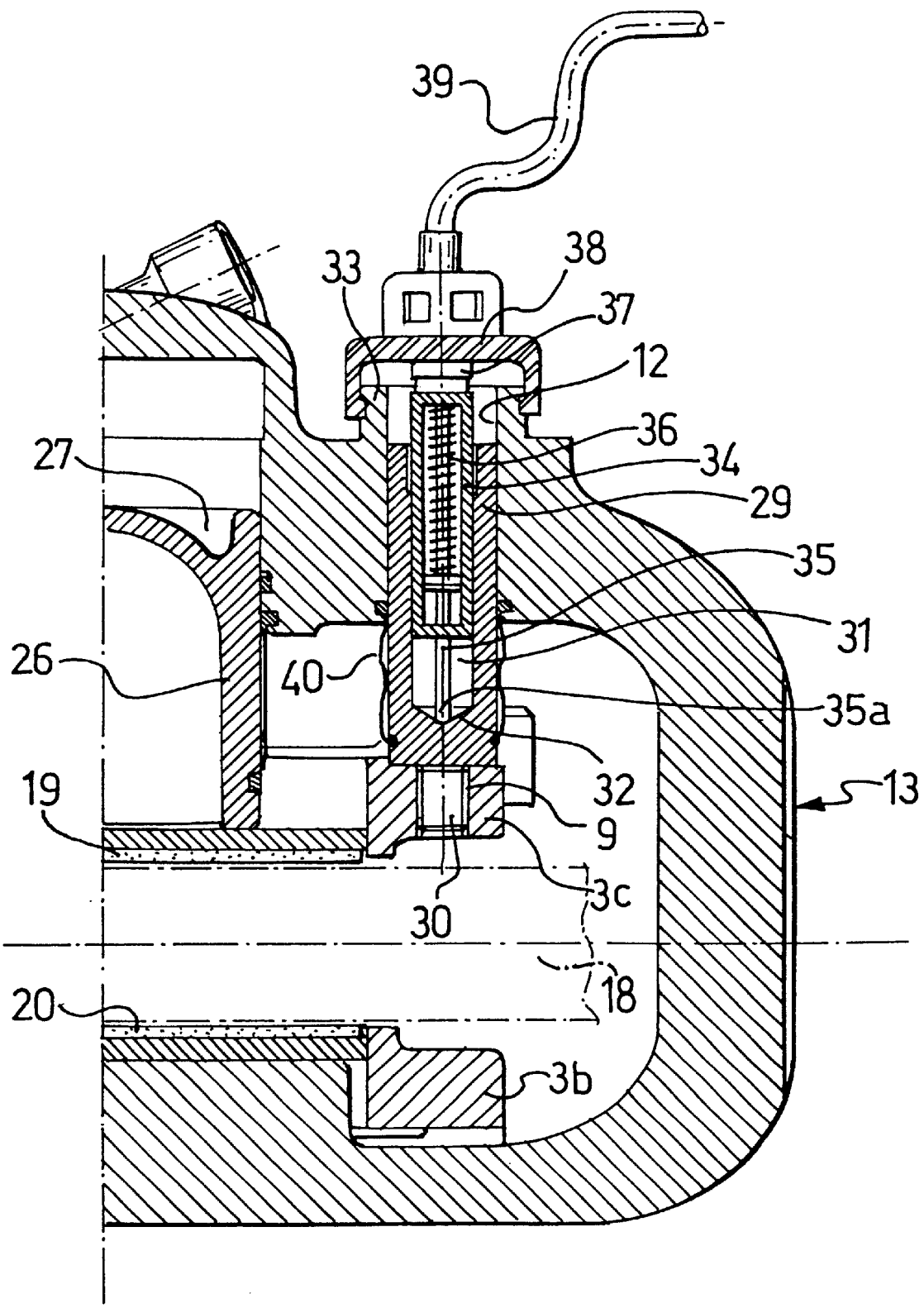
FIG. 5 shows the same cross-section as in FIGS. 3 and 4 but with the warning device in the position assumed when the pads have reached their maximum permitted wear.

FIGS. 3, 4 and 5 show the successive positions assumed by the device as the pad 20 wears down.

As may be deduced from the above description, the warning device according to the invention is contained within the overall dimensions of the caliper body 13, with practically only the cable 39 extending outside them.

It does not therefore obstruct replacement of the pads 19 and 20 when these have worn down.

Furthermore, positioning the transducer inside the hole 12 gives the device the maximum degree of protection.

What is claimed is:

1. A device for indicating wear of the pads of friction material in so-called floating calipers used in the disc brakes of vehicle wheels and comprising a caliper body which is mounted so that it can slide axially by means of at least one hole on at least one guide pin, one end of which is rigidly connected, directly or indirectly, to the wheel stub axle, the axis of the guide pin and of the corresponding hole in the caliper body being perpendicular to the plane of the brake disc, a pair of pads positioned so that they straddle the disc, and a hydraulic piston which acts directly on one of the said pads and indirectly on the other pad, via said caliper body, further comprising a linear electrical displacement transducer transmitting a permanent signal representative of the current caliper pad wear by means of a cable, said electrical displacement transducer being positioned at the internal side of the brake disc, said internal side being defined by said connection to the wheel stub axle between a point connected with the said guide pin and a point connected with the said caliper body which slides with respect to the guide pin so that said cable does not interfere with the plane of said brake disc.

2. A device according to claim 1, wherein the said electrical transducer is housed inside a cavity in a cylindrical element that also fulfills the function of one of the guide pins on which the said caliper body is slidably mounted.

3. A device according to claim 1, wherein the said electrical transducer comprises a first rod-like element, one end of which is connected with the said caliper body, and a second rod-like element which can slide axially with respect to the first element, the free end of which is elastically held in contact with the bottom of the said axial cavity of the said cylindrical body.

4. A device according to claim 1, wherein said linear electrical displacement transducer is supported by said caliper body and is held in contact with one of said guide pins.

5. A device according to claim 4, wherein said contact is maintained through elastic preloading.

* * * * *

UNITED STATES PATENT AND TRADEMARK OFFICE
CERTIFICATE OF CORRECTION

PATENT NO. : 6,272,914 B1
DATED : August 14, 2001
INVENTOR(S) : Alessandro Ciotti It is certified that error appears in the above-identified patent and that said Letters Patent is hereby corrected as shown below:

Title page,
Insert the following:

-- [30] Foreign Application Priority Data
Aug. 5, 1998 [EP] Europe 98830482.0 --

Signed and Sealed this

Fourteenth Day of May, 2002

Attest:

JAMES E. ROGAN
*Attesting Officer*   *Director of the United States Patent and Trademark Office*